United States Patent [19]

Sjöstrand

[11] Patent Number: 4,732,268

[45] Date of Patent: Mar. 22, 1988

[54] ARRANGEMENT ON CONVEYORS

[75] Inventor: Uno Sjöstrand, Flyinge, Sweden

[73] Assignee: Tetra Pak International AB, Lund, Sweden

[21] Appl. No.: 857,139

[22] Filed: Apr. 29, 1986

[30] Foreign Application Priority Data

May 7, 1985 [SE] Sweden ................................ 8502231

[51] Int. Cl.⁴ ............................................. B65G 15/02
[52] U.S. Cl. .................................... 198/831; 198/836; 198/840
[58] Field of Search ............... 198/831, 611, 457, 836, 198/803.16, 624, 840

[56] References Cited

U.S. PATENT DOCUMENTS

| 1,845,297 | 2/1932 | Lathrop | 198/611 |
| 2,263,499 | 11/1941 | Huber . | |
| 2,580,054 | 12/1951 | Vincent | 198/836 X |
| 3,666,082 | 5/1972 | Riggs | 198/836 X |
| 4,230,223 | 10/1980 | Flajnik | 198/836 X |
| 4,479,572 | 10/1984 | Merz | 198/624 X |

FOREIGN PATENT DOCUMENTS

| 119372 | 9/1984 | European Pat. Off. . |
| 222567 | 12/1961 | Fed. Rep. of Germany . |
| 2438181 | 2/1976 | Fed. Rep. of Germany . |
| 146575 | 2/1981 | Fed. Rep. of Germany . |
| 75515 | 4/1917 | Switzerland . |

Primary Examiner—Joseph E. Valenza
Assistant Examiner—Jonathan D. Holmes
Attorney, Agent, or Firm—Burns, Doane, Swecker & Mathis

[57] ABSTRACT

An arrangement on a conveyor of the type which comprises a flexible chain whereupon objects, e.g. parallelepipedic packing containers, are conveyed. The conveyor comprises guide rails (4) located on either side of the chain (1) which steer the packing container. In curves the guide rails are substituted on the one side by a curve disc (5) having a sloping steering surface (8) which acts upon the packing container outwards against the guide rails located on the opposite side of the conveyor. As a result packing containers of different sizes can be conveyed on the conveyor without the conveyor needing adjustment.

10 Claims, 8 Drawing Figures

4,732,268

ARRANGEMENT ON CONVEYORS

FIELD OF THE INVENTION

The present invention relates to conveyors, and, more particularly to conveyors for packages.

BACKGROUND OF THE INVENTION

Conveyors with endless, flexible conveying elements are commonly used for the movement of manufactured packages or packing container blanks between different machines. In the manufacture of non-returnable packages e.g. milk or juice, conveyors are used for transferring the finished packing containers to machines for application of suction tubes, wrapping in shrink film etc. The conveying elements of the conveyors consist of hinged chain segments which run on a support beam and are surrounded by guide rails placed on either side of the conveying element and at different height above the same. The distance between the guide rails is chosen so that, within certain limits, packing containers of different dimensions can be conveyed unhindered without adjustment of the guide rails when the package size is altered. At the points where the conveyor bends, however, the distance between the guide rails has to be increased so that the packing containers do not catch if their length in the direction of transport is greater than their width. As it is also desirable to prevent blockage of the conveyor in cases where a packing container has overturned and is conveyed in a horizontal position through the curve (that is to say, seen in the direction of transport, taking up an appreciably greater length than normal), the distance between the guide rails has to be considerably greater in the curves than in the straight portions of the conveyor. In 90° curves, for example, the distance between the guide rails has to be almost doubled so as to prevent a horizontal packing container from being jammed between the guide rails owing to the increased length when it is to pass the curve. The increased width between the guide rails brings with it inferior guidance of the packing containers which means an increased risk of their turning in an undesirable manner during the passage around the curves. To prevent this it has been suggested to supplement the inner guide rails in the curves with a further steering rail which limits the free width, but which is situated above the guide rails and, more particularly, at such a height that a packing container which has overturned and is thus conveyed in horizontal position can pass unhindered under the steering rail and thereby pass the curve without getting caught.

It has been found that by this principle the risk of undesirable turning of the packing containers in the curves is substantially reduced. However, if the function is to remain as desired an accurate adjustment and adaptation of the steering rail to each individual package size is required.

OBJECT AND SUMMARY OF THE INVENTION

It is an object of the present invention to provide an arrangement on a conveyor, this arrangement making it possible to design the curves of the conveyor with a free width which is such that all relevant types of packing containers can be conveyed unhindered with good steering, irrespectively of whether they are in a vertical or horizontal position.

It is a further object of the present invention to provide an arrangement of the aforementioned type, wherein the steering elements for the control of the packing containers in the curves of the conveyor are designed so that no adjustment or adaptation is required when packing containers of different sizes are conveyed.

It is a further object of the present invention to provide an arrangement of the aforementioned type which is of a simple and reliable design and, moreover, is well suited to being used jointly with conventional conveyors.

These and other objects have been achieved in accordance with the invention in that an arrangement of the type mentioned in the beginning has been given the characteristic that the curve disc has a steering surface for objects conveyed, this steering surface being substantially on a level with the upper surface of the conveying element.

By providing, in accordance with the invention, the rotatable curve disc with a suitably placed steering surface, a correct steering of packing containers of different sizes as well as of packing containers in vertical or horizontal position is achieved automatically. The extra steering rail used previously thus can be excluded and as a result all extra assembling and adjusting work is avoided.

BRIEF DESCRIPTION OF THE DRAWING

A preferred embodiment of the arrangement in accordance with the invention will now be described in greater detail with special reference to the attached, schematic drawings which only show the details which are indispensable for an understanding of the invention.

DETAILED DESCRIPTION OF THE PREFERRED EMBODIMENT

Figure 1:
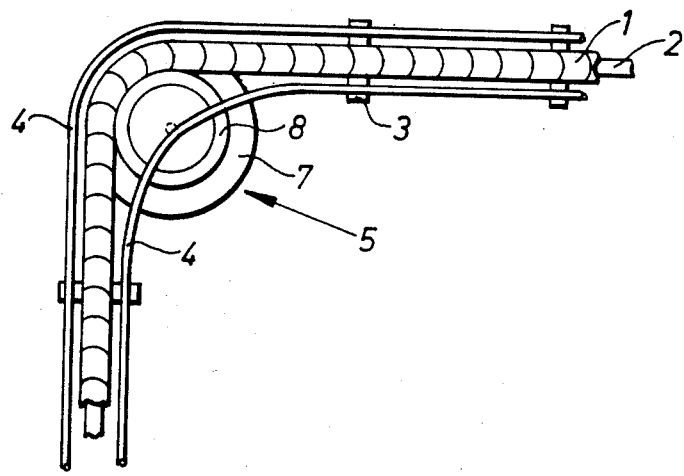
FIG. 1 is a top plan view of the conveyor arrangement in accordance with this invention.
Figure 2:
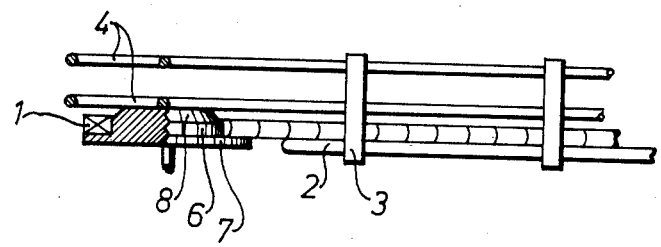
FIG. 2 is a side elevational view of the conveyor arrangement taken partly in section.

In FIG. 1, a portion of a conveyor is shown whose main parts are of conventional type. The conveyor thus comprises a flexible conveying element which consists of a number of segments with plane top surfaces in hinged connection with one another. The conveying element 1 is supported so that it can glide on a support beam 2 (FIG. 2) which in turn is supported by means of consoles or legs not shown in the drawing. The support beam 2 is provided at equal distances with U-shaped fasteners 3 which support guide rails 4 arranged on either side of the conveying element. The guide rails 4 are arranged symmetrically on either side of the conveyor 1 along the straight portions of the conveyor and are at a mutual distance which is such that a packing container, subject to certain steering, may pass unhindered between them. On each side of the conveying element one or more guide rails 4 may be arranged on top of one another, the interval between them and the total height being adaptable to the types of packing containers which are to be transported. When the conveyor bends, e.g. over 90°, as illustrated in FIGS. 1 and 2, the distance between the guide rails 4 arranged on either side of the conveying element 1 is appreciably greater than along the straight portions of the conveyor (FIG. 1). The outer guide rails 4 arranged on the outside of the curve substantially follow the bending of the conveying element 1, whereas the inner guide rails 4 located at the opposite side bend with an appreciably greater radius. The increased free space between the guide rails is provided so as to ensure that even relatively long packing containers or packing containers which, for example, have overturned during the transport should also be able to pass unhindered around the curve.

In the curves of the conveyor the conveying element 1 is steered by means of a curve disc 5 which is arranged substantially horizontally and is supported by the conveyor frame so that it can freely rotate.

The curve disc 5 comprises a cylindrical peripheral surface and a supporting flange 7 projecting under the same which combine to steer and support the conveying element 1 around the curve. Directly above the peripheral surface 6 the curve disc 5 has a steering surface 8 which is in the form of a truncated cone. The steering surface 8 is substantially on a level with the upper surface of the conveying element 1 and consequently can engage with, and steer, passing packages through the curve, which will be explained in more detail in the following with special reference to FIGS. 3, 4 and 5.

Figure 3A:
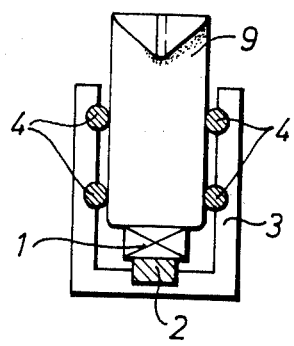
FIG. 3A is a side elevational view in section of a portion of a straight conveyor of conventional type.
Figure 3B:
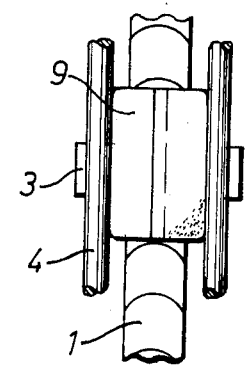
FIG. 3B is a top plan view partly in section of the portion of a straight conveyor of conventional type as shown in FIG. 3A.

As shown in FIGS. 3A and B, a substantially parallelepipedic packing container of known type is conveyed along a straight portion of the conveyor in accordance with the invention. The straight portions of the conveyor are largely of conventional make and comprise, as mentioned earlier, the support beam 2, which supports the conveying element 1 in gliding manner, as well as U-shaped fasteners 3 connected by means of the support beam 2 which carry the guide rails 4 on either side of the conveying element 1 and at such a distance above the same that a packing container conveyed cannot slide out between the guide rails or be overturned by the conveyor.

Figure 4A:
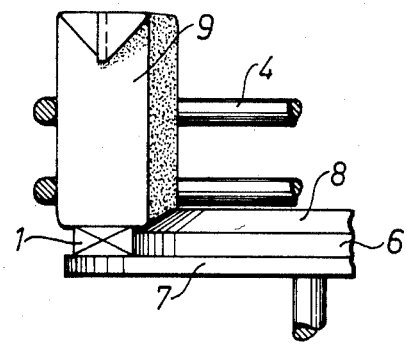
FIG. 4A is a side elevational view of the conveyor arrangement in accordance with this invention partly in section, when a packing container passes in normal operation.
Figure 4B:
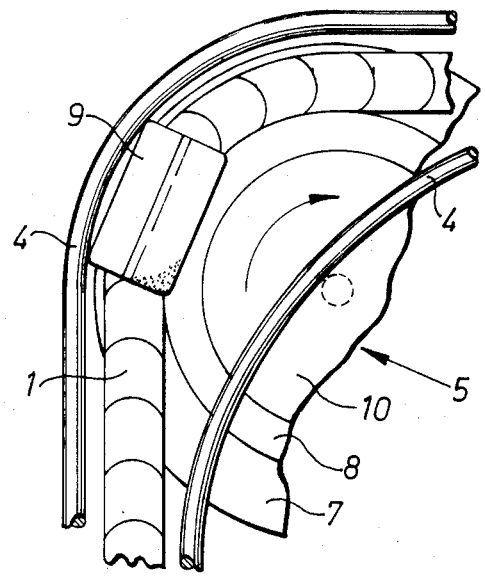
FIG. 4B is a top plan view of the conveyor in accordance with the present invention partly in section, when a packing container passes in normal operation.

In the FIGS. 4A and 4B the packing container 9 conveyed has come up to a curve where the conveyor bends over 90°. The distance between the guide rails 4 increases in the curve and rises to substantially double the normal distance. This is brought about by the inner guide rail 4 extending along an appreciably greater radius than the outer guide rail which largely follows the conveying element 1. Hence the steering function of the inner guide rail will cease and the steering on the side of the packing container 9 facing towards the axis of rotation of the curve disc will be taken over by the sloping steering surface 8 of the curve disc which comes into contact with the bottom edge of the packing container 9. Since the steering surface 8 is substantially on a level with the upper surface of the conveying element and is of a height of between 5 and 20 mm, the upper part of the steering surface, limited by the top side 10 of the curve disc, will prevent any sliding of the packing containers 9 off the conveying element 1 or their being turned in such a manner that their orientation in relation to the conveying element is altered. The steering surface 8, whose slope amounts to between 30° and 80°, preferably about 45°, against the axis of rotation of the curve disc 5, will force the packing containers 9 outwards so that during the whole passage around the curve they glide against the outer guide rails 4.

Figure 5A:
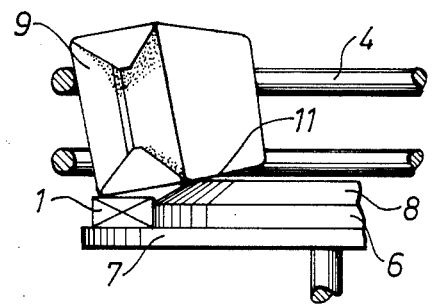
FIG. 5A is a side elevational view partly in section of the conveyor arrangement in accordance with the invention, when the packing container passes in a horizontal position.
Figure 5B:
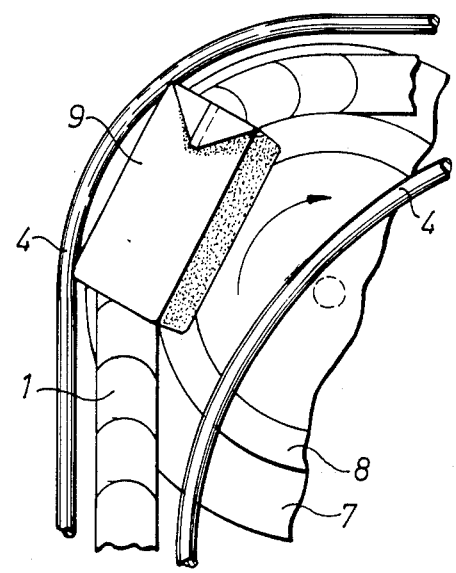
FIG. 5B is a top plan view partly in section of the conveyor arrangement in accordance with the present invention partly in section, when a packing containiner passes in horizontal position.

In FIGS. 5A and 5B the same part of the arrangement in accordance with the invention is shown as in FIG. 4, but the packing container 9 conveyed now has overturned forwards during an earlier stage of the transport and is conveyed, therefore, in horizontal position. This represents no change compared with what has been described earlier as long as the packing container 9 is conveyed along a straight section of the conveyor, but when the packing containers approach a curve, their front bottom corner will be in contact first with the steering surface 8 of the rotating curve disc 5, the front end of the packing container, seen in the direction of transport, being acted upon outwardly to rest against the outer guide rails 4. When the packing container 9 commences its turning movement around the curve the straight edge line 11 situated after the said package corner will successively "climb" up the steering surface 8 until the edge 11 as well as the bottom surface of the packing container at the time will rest, with the packing container in oblique position, against the top surface 10 or the circular boundary line between the said top surface 10 and the steering surface 8 of the curve disc 5. Since the top surface 10 of the curve disc 5 is situated from 2 to 15 mm, preferably 8 mm, above the upper surface of the conveying element 1 the packing container 9 will lean outwards in the direction from the vertical axis of rotation of the curve disc 5 and thus will be maintained in contact with the outer guide rails 4. As a result the packing containers, irrespectively of the orientation position they are in as they approach the curve, will be conveyed around the same with their orientation position unchanged without catching between the guide rails 4 or in some other manner causing a stoppage in the transport. Since the space between the guide rails 4 is substantially increased in the curve, even high packages may pass unhindered in horizontal condition, and any adjustment of the different parts of the conveyor is no longer required.

Practical trials have proven that the arrangement in accordance with the invention functions well. The steering surface 8 designed as a truncated cone operates satisfactorily with diverse slopes and the outer limits appear to be approx. 30 and 80 degrees respectively against the axis of rotation of the curve disc. However, angles of approx. 45 degree are preferred as they prove to give optimum results by allowing packing containers of a wide variety of dimensions to be steered unhindered by, and "climb" up, the surface. To ensure that a relatively long package should be able to be conveyed in horizontal position around curves without problems and with good contact against the outer guide rails 4 it has been found to be appropriate for the top side 10 of the curve disc to be between 2 and 15 mm above the top surface of the conveying element, the larger dimension being preferred if mainly large packing containers are to be conveyed. A good mean value has proved to be 8 mm. The steering surface extends from the top side 10 of the curve disc to the peripheral surface 6 of the curve disc and extends below the top surface of the conveying element in the preferred embodiment. The steering surface ought to extend between 5 and 20 mm, preferably approx. 15 mm, from the top side 10 so as to ensure that packing containers with undefined or deformed corners and edge lines can be conveyed securely around curves.

It is of course possible to embody the invention in other specific forms than those of the preferred embodiment described above. This may be done without departing from the essence of the invention. The preferred embodiment is merely illustrative and should not be considered restrictive in any way. The scope of the invention is embodied in the appended claims rather than in the preceding description and all variations and changes which fall within the range of the claims are intended to be embraced therein.

What is claimed is:

1. Conveyor apparatus comprising:
   means for conveying packages along a predetermined path including a curved portion, said conveying means being formed by a flexible conveying element having an upper conveyor surface;
   track means for supporting said flexible conveying element for movement along said predetermined path with a curved portion of said path;
   guide means extending along and adjacent an outer circumference of said curved portion of said path and above said upper conveyor surface for guiding packages through said curved portion of said path; said track means including urging means for urging packages toward said guide means while said flexible conveying element conveys the packages along said curved portion of said path, said urging means including a rotatable curve disc having a steering surface which is sloped with respect to said upper conveyor surface and which extends from a first level at least as low as said upper conveyor surface to a second level above said upper conveyor surface such that packages conveyed around said curved portion of said path are urged toward said guide means by said sloped steering surface while said flexible conveying element conveys the packages.

2. The conveyor apparatus in accordance with claim 1, wherein said steering surface is formed in the shape of a truncated cone.

3. The conveyor apparatus in accordance with claim 2, wherein said curve disc is rotatable around an axis of rotation and said steering surface slopes between 30° and 80° against said axis of rotation of the curve disc.

4. The conveyor apparatus in accordance with claim 1, wherein said curve disc further includes a circular end surface and a cylindrical side surface, said steering surface extending between said end surface and said side surface.

5. The conveyor apparatus in accordance with claim 4, wherein said curve disc has a supporting flange adjoining said side surface, said flange carrying said flexible conveying element.

6. The conveyor apparatus in accordance with claim 5, wherein said conveying element has a height which is less than the distance between said supporting flange and said circular end surface of said curve disc.

7. The conveyor apparatus in accordance with claim 4, wherein said upper surface of said conveying element is located substantially between 1 and 15 mm beneath said circular end surface of said curve disc.

8. The conveyor apparatus according to claim 1 including guide rails extending along opposite sides of said path at said curved portion for retaining packages on said curve disc.

9. The conveyor apparatus in accordance with claim 8, wherein said steering surface has a height of between 5 and 20 mm.

10. An arrangement in accordance with claim 1 wherein said axis of rotation of said curve disc is vertical.

* * * * *